(12) United States Patent
Turner

(10) Patent No.: US 6,258,292 B1
(45) Date of Patent: Jul. 10, 2001

(54) ALTERNATIVE REFRIGERANT INCLUDING HEXAFLUOROPROPYLENE

(76) Inventor: Donald E. Turner, 2913 Crown Colony Ct., Mobile, AL (US) 36695

( * ) Notice: Subject to any disclaimer, the term of this patent is extended or adjusted under 35 U.S.C. 154(b) by 0 days.

(21) Appl. No.: 09/248,784

(22) Filed: Feb. 12, 1999

Related U.S. Application Data

(63) Continuation-in-part of application No. 08/694,279, filed on Aug. 8, 1996, now abandoned, which is a continuation-in-part of application No. PCT/US97/14889, filed on Aug. 8, 1996.

(51) Int. Cl.[7] ...................................................... C09K 5/04
(52) U.S. Cl. ................................................. 252/67; 62/114
(58) Field of Search ................................ 252/67; 62/114

(56) References Cited

U.S. PATENT DOCUMENTS

| | | | |
|---|---|---|---|
| Re. 14,955 | 10/1920 | Crawford | 252/67 |
| 4,157,979 | 6/1979 | Walters | 252/162 |
| 4,482,465 | 11/1984 | Gray | 252/67 |
| 4,810,403 | 3/1989 | Bivens et al. | 252/67 |
| 5,104,560 | 4/1992 | Huster et al. | 252/58 |
| 5,108,637 | 4/1992 | Pearson | 252/67 |
| 5,221,492 | 6/1993 | Bartlett | 252/67 |
| 5,236,611 | 8/1993 | Shiflett | 252/67 |
| 5,248,433 | 9/1993 | Felix et al. | 252/67 |
| 5,254,279 | 10/1993 | Takemasa et al. | 252/67 |
| 5,254,280 | 10/1993 | Thomas et al. | 252/68 |
| 5,282,968 * | 2/1994 | Lee | 210/640 |
| 5,372,737 | 12/1994 | Spauschus | 252/68 |
| 5,492,643 | 2/1996 | Weber, III | 252/68 |
| 5,714,083 * | 2/1998 | Turner | 252/68 |

FOREIGN PATENT DOCUMENTS

| | | | |
|---|---|---|---|
| 2228739A | 5/1990 | (GB) | C09K/5/00 |
| 3-93888 * | 4/1991 | (JP) . | |
| 4-288452 | 10/1992 | (JP) | F25B/1/00 |
| 97/11138 * | 3/1997 | (WO) . | |

OTHER PUBLICATIONS

Chemical Abstracts, AN 105:198018, "Vapor–liquid equilibria of Freon 22 and hexafluoropropylene binary system under moderate pressures", Feng, 1986 no month available.*

* cited by examiner

*Primary Examiner*—Christine Skane
(74) *Attorney, Agent, or Firm*—Garvey, Smith, Nehrbass & Doody, L.L.C.

(57) ABSTRACT

An alternative refrigerant to chlorofluorocarbons and their substitutes such as R-12 and R-134*a* and for R-22, and demonstrating improved performance as a refrigerant than those substituted for while having the properties of being nontoxic, non-corrosive, nonflammable and safer to the environment including a blend of one or more of fluorocarbons known in the industry as R-1216 and R-22.

3 Claims, 3 Drawing Sheets

ALTERNATIVE REFRIGERANT INCLUDING HEXAFLUOROPROPYLENE

CROSS REFERENCE TO RELATED APPLICATIONS

This application is a Continuation-In-Part of U.S. application Ser. No. 08/694/279 filed Aug. 8, 1996 now abandoned, and International Application Number PCT/US97/14889 filed Aug. 8, 1996.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

Two of the most commonly used refrigerants for cooling (e.g., air conditioning) and refrigeration until recent years were R-12 and R-22. In January 1994, the further sale of R-12 (a chlorofluorocarbon) was banned rendering it unavailable for automotive use (its largest application). R-12 was also used with other refrigerants to achieve useful mixtures of other effective refrigerants. The refrigerant was known to exhibit good compatibility with mineral oils utilized for lubrication of compressors in the refrigeration system and performed the important role of returning refrigerant back to the compressor. Another common refrigerant is R-22, chlorodifluoromethane, though facing a ban in the future, still is widely used in freezers and ice making equipment.

The chlorofluorocarbons in wide use as refrigerants, such as R-12, are thought to have detrimental long term environmental effects and suitable alternatives have been vigorously sought since the realization of the detrimental effects. The accumulating evidence that the chlorofluorocarbons, because of their high stability, when released to the atmosphere, are able to reach the stratosphere has prompted substantial scientific study of the impact on the stratosphere. Evidence now supports the proposition that, under the influence of ultraviolet radiation, the chlorine atoms are released and undergo a chemical reaction with the ozone naturally occurring in the stratosphere. The observed effects of global warming is thought to be promoted by the thinning of the ozone layer occurring, at least in part, as a consequence of the chlorine-ozone reaction enabling greater amounts of ultraviolet light to reach the earth's surface.

The search for alternative refrigerants to harmful chlorofluorocarbons has been accelerated with the banning of the manufacture and sale in the United States of the refrigerant R-12, which was the refrigerant of choice for automotive and other portable commercial cooling systems. Alternatives such as the halocarbons, including fluorinated carbons, chlorinated carbons and brominated carbons are known and used as refrigerants. The most commonly used of the halocarbons are the fluorocarbons. The halocarbons have the desirable properties of being nonflammable and nontoxic.

Hydrocarbons, and particularly those of lower molecular weights (i.e., below about 70) have also been used as refrigerants. While being both effective and inexpensive, the hydrocarbon refrigerants are flammable which poses concerns when the refrigerant is leaked out of the system. When hydrocarbons are included as a constituent of a refrigerant, it is important for the refrigerant to exhibit azeotropic or near azeotropic properties such that any evaporation (loss) of the refrigerant experienced occurs in approximately the same rate as the other constituents. Only if the constituents exhibit this character, will the evaporated gas be nonflammable. Collaterally, it is important that during any experienced loss of refrigerant that the relative ratios of constituents not change appreciably, otherwise the thermodynamic properties of the refrigerant are likely to change causing the performance to deteriorate and perhaps damage the equipment. Irrespective of the satisfactory inclusion of hydrocarbons into compatible refrigerants improving the performance of such refrigerants, there are many elements of the refrigeration industry which still oppose the use of hydrocarbons for or in refrigerants.

R-22, a chlorodifluoromethane, is widely utilized in commercial refrigeration systems however, has the undesirable characteristic of requiring a low suction temperature in the compressor to avoid a rise in the discharge temperature. To overcome this characteristic, R-22 is commonly blended with smaller amounts of other refrigerants such as R-124, R-142$b$, R-152$a$ or R-218 to produce a favorable vapor pressure/temperature curve.

An environmentally friendly commercial replacement for refrigerant R-12 is R-134$a$ however, while the refrigerant exhibits a somewhat similar profile of the pressure/temperature curve of R-12, its performance capacity is noticeably less than R-12. R-134$a$ does exhibit a different temperature relationship at higher operating temperatures than R-12. Were R-134$a$ to be bled into a R-12 system, as a gradual replacement (i.e., topping off) the performance of the system at higher temperatures would gradually deteriorate, just when the system was in need. The point would be reached when the concentration of R-134$a$ was sufficiently high that the system would shut down, unable to handle the higher pressures generated by R-134$a$. It is not uncommon for systems utilizing R-134$a$ to require substantially more power for a given cooling or, alternatively, a considerably longer operating cycle to maintain a temperature in the system. In those systems which are already pressed to their capacities, the switch to R-134$a$ from R-12 may render the system unable to maintain the set system temperatures under normal operating conditions. In such instances, the physical capacity of the system may have to be increased (retrofitting increased condenser and evaporation size) for satisfactory climate control.

Additionally, a substantial modification of the R-12 refrigerating/cooling system may be required before use of the replacement R-134$a$. R-134$a$ is not compatible with the lubricating oils utilized with R-12, therefore it must be purged from the system before the charging with R-134$a$. Most systems including automotive systems utilizing R-12 include a lubricant, which is insoluble in R-134$a$, causing further incompatibility of the mixture. Changing the lubricant to the synthetic based oil required by R-134$a$ may also require a change of seals if they are not compatible with R-134$a$. Or the oil required thereby With the cessation of sale of R-12, recharging of the refrigerant in the automotive system with R-134$a$ thus requires an expensive retrofit to the system to accommodate the parameters of the replacement refrigerant and a complete purging of the system to ensure proper performance of the recharged system.

The quest for suitable substitutes for the harmful chlorofluorocarbons is complicated by the limited number of single fluorinated hydrocarbons which demonstrate the desirable refrigerant properties. Mixtures of known fluorinated hydrocarbons might be used if the desired combination of properties could be found in a given mixture. The creation of simple mixtures also generates problems for the design and operation of refrigeration systems in that the components may segregate in vapor and liquid phases. While concentration is accordingly directed to azeotropic blends or combinations, avoiding the segregation problems, the identification or formulation of such blends is not predictable, particularly when cost, flammability and toxicity are primary concerns.

SUMMARY OF THE INVENTION

The present invention is directed to a blend of a fluorocarbon and hexafluoropropylene in an homogeneous mixture which performs as a superior replacement refrigerant in systems designed for prior chlorofluorocarbons without retrofitting of the system, which operate in a manner essentially paralleling the temperature/pressure curve of the replaced refrigerant.

The novel composition of the refrigerant of the present invention may be varied in the weight percentages of components to exhibit the various vapor pressure/temperature curves of several present commercial refrigerants utilized in existing systems such that no retrofitting of the system is required.

The refrigerant of the present invention is particularly suitable for the replacement of R-12 and R-134a with a non-ozone depleting alternative yet being directly substitutable into such system without need for retrofitting since the refrigerant may be modified to exhibit similar operating parameters of the refrigerant to be replaced. When the present invention is substituted for R-134a it provides significant operating performance however, the lubricant utilized in that system must be replaced with a mineral based oil which in the inventive refrigerant provides excellent miscibility and lubrication of the system. An alternative embodiment of the invention is particularly suited as a replacement for R-22 and provides increased operating performance over R-22.

The refrigerant of the present invention provides a more universal refrigerant than those presently used in automotive and portable systems and is compatible with large commercial systems, being able to be modified, such as during installation into a system, in its blend of ingredients to match the vapor pressure/temperature of a variety of refrigerants, thereby eliminating the need to inventory several different refrigerants or modified formulations thereof.

These and other advantages and objects of the present invention will become evident from the following description of preferred and alternative embodiments.

BRIEF DESCRIPTION OF THE DRAWINGS

The present invention may be more fully understood with reference to the accompanying drawings in which:

FIG. 2 is a vapor pressure/temperature graph illustrating the performance of an alternative embodiment of the invention in relation to R-134a.

DESCRIPTION OF PREFERRED EMBODIMENTS

Figure 1:
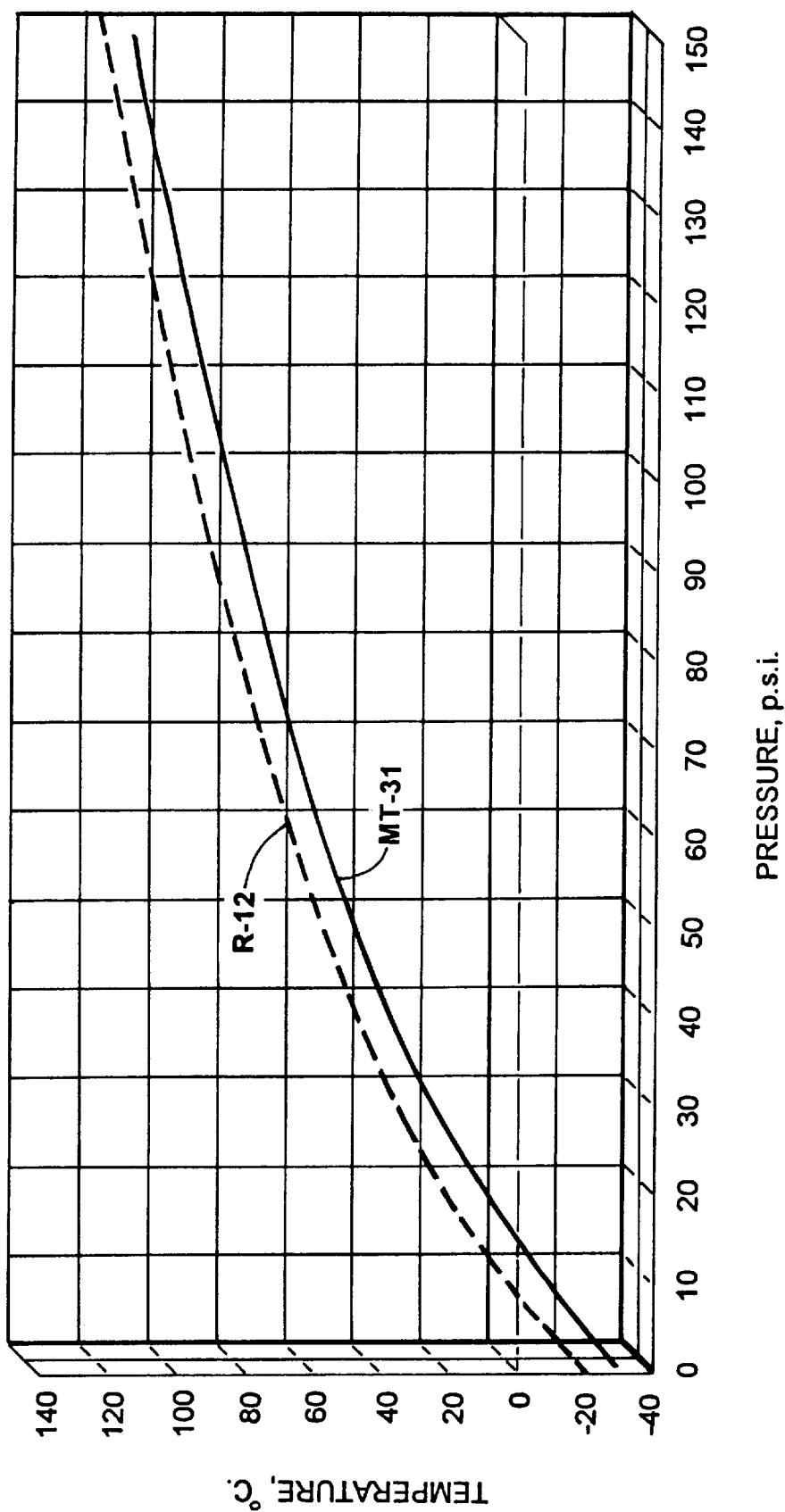
FIG. 1 is a vapor pressure/temperature graph illustrating the performance of the invention in relation to R-12.

With the elimination of refrigerant R-12 from the market because of its detrimental environmental characteristics, it was important to reexamine alternative refrigerants known to not be harmful if released. It is well known that hexafluoropropylene in pure form is an effective refrigerant however, it has not seen wide usage, partly because of cost and partly because its performance curves do not match the operating parameters required by commercial systems already designed and in use. Unless the temperature-pressure curve of a refrigerant proposed for substitution in an operating system without modification of the system, its temperature-pressure characteristics must closely match those of the refrigerant substituted for. As with the instance of R-134a and R-12 it is seen that while there is some similarity of the temperature-pressure curve, performance of the R-134a is less efficient, particularly in the high temperature region. It is therefore a primary requirement for substitutability that sufficient cooling or refrigeration is achieved with the substitute that the system not require alteration or retrofitting. Secondly, though there may be sufficient performance to provide cooling, it is of importance that the substitution not cause the system to run in a less efficient or more costly manner. While R-134a is deemed a suitable substitute for R-12, there is noticeable loss of cooling capacity in a system in which it is used as well as reflecting a significant increase in cost of operation of the refrigeration system, simply explained by the system's having to work harder.

The development of the present invention is founded upon the principle of formulating a composition of hexafluoropropylene and chlorodifluoromethane and adjusting the ratios of constituents to achieve performance characteristics comparable to selected refrigerants which in the preferred embodiments, are R-12, R-134a, R-22. The preferred component compositions are hexafluoropropylene (R-1216) and chlorodifluoromethane (R-22). Hexafluoropropylene is present in weight percent preferably from about 70% to about 95% and chlorodifluoromethane is present in weight percent preferably from about 5% to about 30% for a R-12 or a R-134a replacement. For a more efficient and thermally productive substitute for R-22, the preferred ranges of components are hexafluoropropylene from about 5% by weight to about 30% by weight and chlorodifluoromethane from about 70% by weight to about 95% by weight.

When substituted in an R-12 system, the following operating parameters are achieved:

| | | |
|---|---|---|
| 1. | Mole weight of the blend | 89.9 |
| 2. | Boiling point | −31° F. |
| 3. | Lubrication | Mineral oil |
| 4. | Non-flammable | |
| 5. | Non-toxic | |
| 6. | Specific gravity | 1.109 |
| 7. | Critical temperature | 248° F. |
| 8. | Non-corrosive | |
| 9. | Critical pressure | 581.7 Psia |
| 10. | Specific heat BTU/Lb | 17.16 (Mol F) |
| 11. | Vapor pressure at 70° F. | 97 Psia |

To put the relative performances of systems with the inventive refrigerant compared to R-12 and R-134a, it is noted that R-12 provides an 8% more efficient performance than R-134a. When the inventive substitute refrigerant was run in the R-12 system, it ran at 8% more efficiently than the R-12 system. When the substitute refrigerant was run in an R-134a system, its performance was 23% more efficient than the R-134a operation. These are noted as substantial increases of performance by those knowledgeable of conventional refrigeration systems.

For further comparison, the following temperature/pressure values were exhibited by the substitute refrigerant in the R-12 system:

| | | |
|---|---|---|
| 1. | Compressor discharge line | 160° F. |
| 2. | Condenser outlet to receiver | 98° F. |
| 3. | Receiver outlet | 70° F. |
| 4. | Evaporator (first two coils) | 4° F. |
| 5. | Compressor suction | 14° F. |
| 6. | Pressure drop across evaporator | 3 psi |

Using a normal mechanical compressor with a 2 inch stroke and a 2 inch bore with a standard 0.012 inch clearance, the compressor ratio is 82.0:1 @ 1750 rpm.

The composition of the present invention of the selected ranges of essentially R-1216 and R-22 provide some very important attributes, principally in the extremely efficient thermodynamic properties. While previously the inclusion of a low molecular weight hydrocarbons (known to have extremely good thermodynamic characteristics) was felt necessary to be used with the R-1216 and R-22 in the present invention to produce the desired vapor pressure/temperature curve to closely match the refrigerant to be substituted for, it has now been discovered that the profile of the common refrigerants R-12, R-134a and R-22 (alone) may be emulated without the inclusion of a potentially flammable constituent while improving the performance of the system in which the inventive refrigerant is utilized.

As is known, the inclusion of a flammable hydrocarbon into the combination of R-1216 and R-22 refrigerants facilitates the lubrication in the system to flow freely to the compressor, though inclusion for this purpose was not felt necessary. It is necessary that the compressor lubrication complete the refrigeration cycle and return to the compressor as quickly as possible to preclude it from failing for lack of lubrication. Because such hydrocarbons as R-290 are flammable, nonflammable components that suppress the flammability were added to the blend of refrigerants. The addition of R-22 served that purpose. Being known as a superior flame suppressant, it is used frequently in aircraft fire extinguishers. R-1216 is likewise nonflammable and is the major constituent of the present invention, being selected because of its similarly good thermodynamic properties, environmental friendliness and overall safety as a material. Collectively, the constituents provide a near azeotropic refrigerant.

One of the formulations of the alternative refrigerant of the present invention that exhibits the thermodynamic properties of R-12 is composed of from about 70% to about 95% hexafluoropropylene; from about 5% to about 30% chlorodifluoromethane. FIG. 1 illustrates the pressure/temperature curve of this refrigerant (identified as MT-31) with the solid line. It will be noted upon examining the curve that the profile extends from −30° C. to about 100° C. at pressures ranging from about 0 pounds per square inch to about 150 pounds per square inch. Further examination of the Figure discloses that the MT-31 pressure/temperature profile closely parallels that for R-12, as indicated with the dotted line on the Figure. The blend of ingredients for the refrigerant whose pressure/temperature curve is illustrated was about 88% by weight of R-1216, about 12% by weight of R-22.

Figure 2:
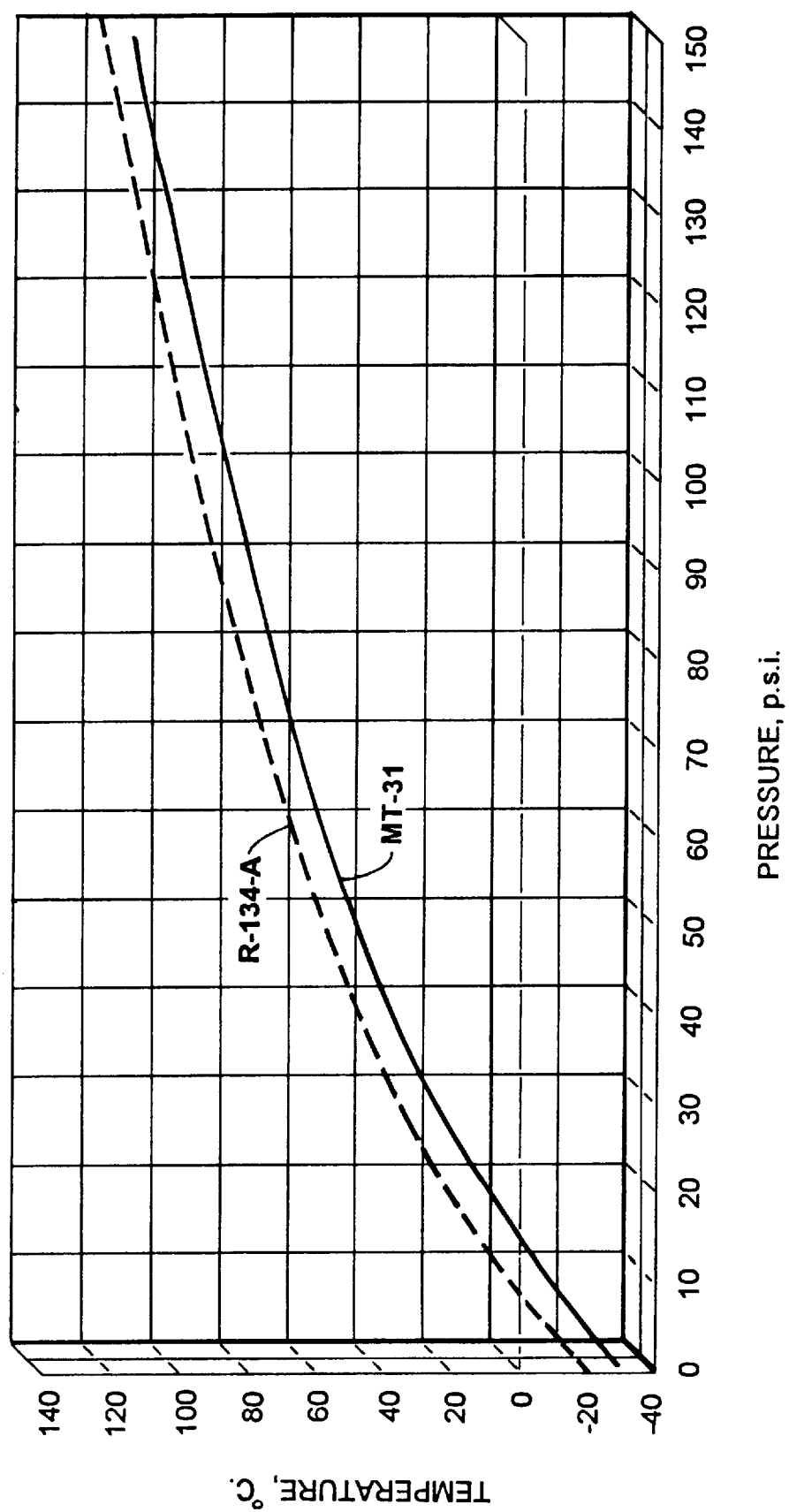

Referring now to FIG. 2, it will be seen that as with the R-12 profile of FIG. 1, the pressure/temperature profile for the alternative refrigerant of the present invention closely parallels with that of R-134a, indicated by the dashed line on FIG. 2 over the same general ranges as FIG. 1. It should be noted that the vapor pressure/temperature curves for R-12 and R-134a are essentially similar over the examined operating range. The blend of ingredients for the refrigerant whose pressure/temperature curve is illustrated was about 90% by weight of R-1216, about 10% by weight of R-22. It should be noted that the MT-31 alternative refrigerant vapor pressure/temperature curve illustrated in Figure is unperceptibly changed from that in FIG. 2, although the percentages by weight of R-22 and R-1216 have been varied somewhat, illustrating the stability of the MT-31 refrigerant curve to variations of these magnitudes. It is noted that outside the ranges stated above, the similarity of performance of the combination of R-1216 and R-22 drops off markedly.

Figure 3:
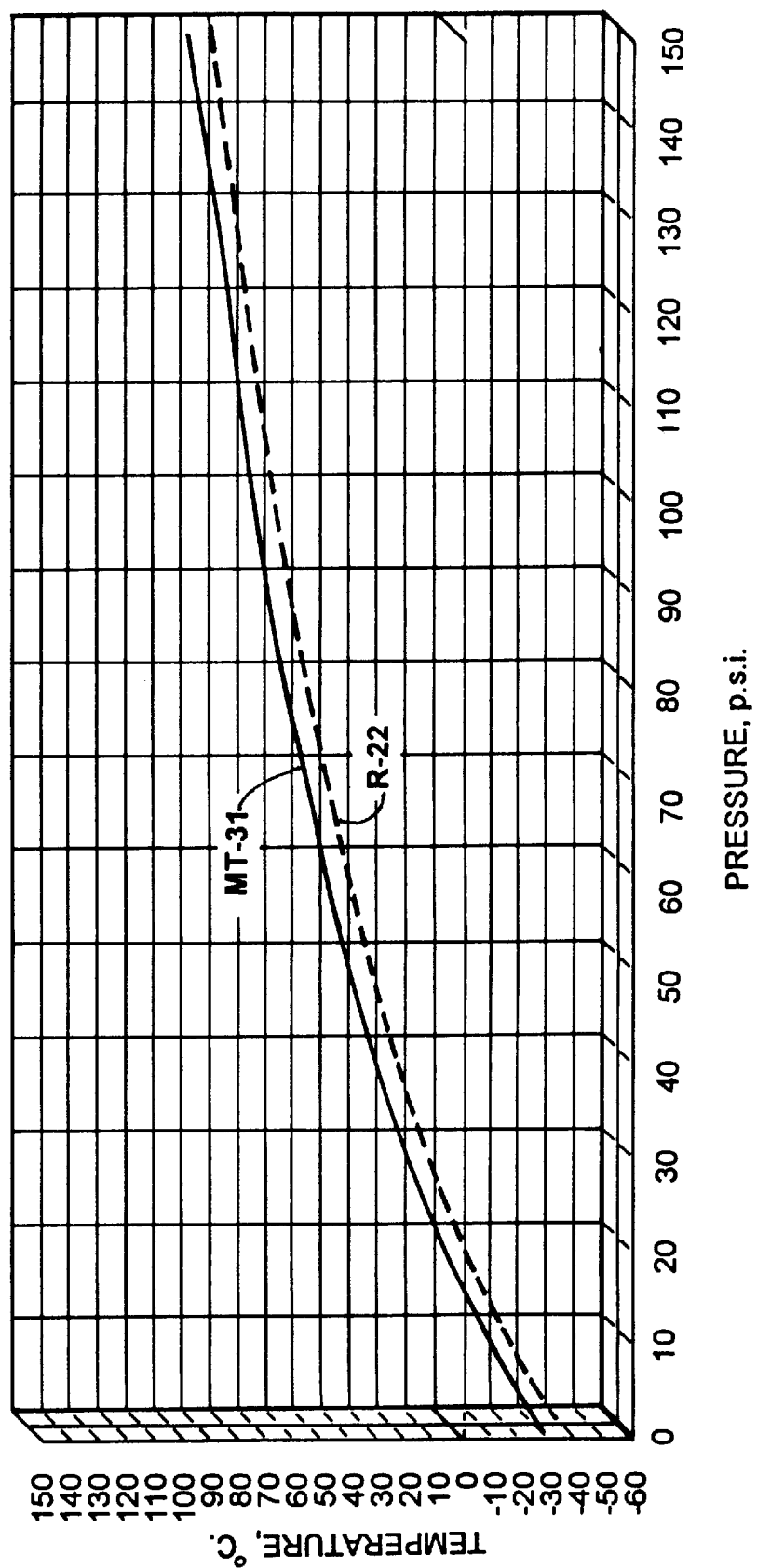
FIG. 3 is a vapor pressure/temperature graph illustrating the performance of a further alternative embodiment of the invention in relation to R-22.

Referring now to FIG. 3 illustrates the pressure temperature curve for the MT-31 alternative refrigerant, wherein the ratios of constituents are blended such that the thermodynamic properties of the refrigerant approximate those of the refrigerant R-22. The composition of MT-31 for the substitution for R-22 is composed of from about 5% by weight to about 30% by weight of hexafluoropropylene (R-1216; and from about 70% by weight to about 95% chlorodifluoromethane (R-22). In its preferred embodiments the improved replacement for R-22 is composed from about 7% by weight to about 12% by weight of hexafluoropropylene (R-1216; and from about 93% by weight to about 88% chlorodifluoromethane (R-22). Figure illustrates the pressure/temperature curve of this refrigerant identified as with the solid line and R-22 as a dashed line. In FIG. 3 the composition of the substitute refrigerant is composed of about 7% by weight of hexafluoropropylene and about 93% by weight of chlorodifluoromethane. It will be noted upon examining the curve that the profile extends from about −30° C. to about 100° C. at pressures ranging from about 0 pounds per square inch to about 150 pounds per square inch. Further examination of the FIG. 4 discloses that the MT-31 pressure/temperature profile closely parallels that for R-22. The remarkable discovery is that the novel refrigerant provides a significant improvement in refrigerant performance measured as lower power requirements to operate the system and increased cooling capacity from the system. Those skilled in the are will immediately recognize that the novel substitute thus provides significant savings in operating cycle (wear and tear on the machinery) and less power to run the system when it is operating, both of which are very desirable characteristics.

It is this recognized capability to adjust particularly the upper portions of the vapor pressure/temperature curves of the alternative refrigerant of the present invention which allows for the matching, albeit improvement of its vapor pressure/temperature curve to that of a selected refrigerant which may provide the more effective performance in the higher temperature ranges and corresponding lower power and cycle requirements.

Additional advantages of the present invention were discovered under the testing of the use of the refrigerant in a system. It is well recognized in the field of refrigeration that the temperature of the suction (low side) and the discharge (high side) of the refrigeration compressor is critical to the efficiency (capacity) of the system. The refrigerant of the present invention, when charged into a system designated to use any of R-12, R-134a, and R-22 reduces the suction (low side) temperature of the compressor 10% or more and reduces the discharge (high side) 15% or more. Those familiar with the principles of refrigeration will recognize that the reduction of suction and discharge temperatures reflects the greater compressibility of the refrigerant of the present invention. Reduction of these temperatures illustrates the lesser amount of energy necessary to operate the cooling cycle and the gain in efficiency/capacity. Therefore, not only is a refrigerant provided that is ultimately less toxic and degrading to the environment, but also provides improved operating parameters for the system.

As is recognized, the above described alternative refrigerants to R-12 and R-22 include hexafluoropropylene (R-1216) as the primary component. As described above, R-22 is added to the hexafluoropropylene to improve the exhibited thermodynamic capacity of the refrigerant and to cause its temperature/pressure curve to closely match those of R-12 and R-22, such that the alternative refrigerant will perform in the selected system in a manner consistent to the refrigerant replaced. R-22 is not as environmentally friendly as numerous other refrigerants available and is scheduled for a ban in 2010 by the U.S. Environmental Protection Agency. At that time, all compounds incorporating any amount of the component will have to be withdrawn from the market. As related above, hydrocarbons are known flammable substances and numerous facilities summarily refuse to utilize refrigerants including hydrocarbons with that concern.

As will be apparent to persons skilled in the art, various additional modifications, adaptations and variations of the foregoing specifically disclosed embodiments can be made without departing form the objectives and scope of the present invention.

Accordingly, I claim:

1. A method for operating a refrigeration unit adapted to utilize refrigerant R-22 as the refrigerant medium comprising substituting for R-22 a refrigerant composition consisting essentially of:

(i) chlorodifluoromethane in an amount from about 70% to about 95% by weight; and (ii) the balance of hexafluoropropylene.

2. The method according to claim 1 wherein the composition is a substitute for refrigerant R-22 consists essentially of:

(i) chlorodifluoromethane in an amount from about 88% by weight to about 93% by weight; and (iii) the balance of hexafluoropropylene.

3. The method according to claim 2 wherein the composition includes chlorodifluoromethane in an amount of about 93% and the balance is hexafluoropropylene.

* * * * *